United States Patent
Beaumont et al.

(10) Patent No.: US 6,553,924 B2
(45) Date of Patent: Apr. 29, 2003

(54) CO-COMBUSTION OF WASTE SLUDGE IN MUNICIPAL WASTE COMBUSTORS AND OTHER FURNACES

(75) Inventors: E. Larry Beaumont, Littleton, CO (US); Larry D. Richardson, Delmar, NY (US); Kevin G. Rousseau, Windsor, MA (US)

(73) Assignee: ECO/Technologies, LLC, Albany, NY (US)

( * ) Notice: Subject to any disclaimer, the term of this patent is extended or adjusted under 35 U.S.C. 154(b) by 0 days.

(21) Appl. No.: 09/918,924

(22) Filed: Jul. 31, 2001

(65) Prior Publication Data

US 2002/0050236 A1 May 2, 2002

Related U.S. Application Data

(63) Continuation-in-part of application No. 09/420,291, filed on Oct. 18, 1999, now Pat. No. 6,279,493.
(60) Provisional application No. 60/104,806, filed on Oct. 19, 1998.

(51) Int. Cl.[7] .............................. F23N 5/18; F23G 7/04; F23G 5/02; F23K 1/00
(52) U.S. Cl. ..................... 110/238; 110/233; 110/218; 110/219; 110/185
(58) Field of Search ................................ 110/346, 347, 110/348, 190, 233, 342, 235, 238, 219, 185, 222, 341, 218, 186; 431/117; 210/768, 769, 917, 241, 218, 620, 251, 96.1

(56) References Cited

U.S. PATENT DOCUMENTS

| | | |
|---|---|---|
| 1,892,681 A | 1/1933 | Rankin |
| 3,322,079 A | 5/1967 | Komline et al. |
| 3,659,786 A | 5/1972 | Vier et al. |
| 3,838,651 A | 10/1974 | Dingwell |
| 3,903,813 A | 9/1975 | Pan |
| 3,980,417 A | 9/1976 | Dierckx |
| 3,984,217 A | 10/1976 | Huntington |
| 3,991,689 A | 11/1976 | Rinecker |
| 4,073,242 A | * 2/1978 | Wagner ....................... 110/8 R |
| 4,346,661 A | 8/1982 | Nakamura |
| 4,372,226 A | 2/1983 | Erlandsson |
| 4,473,459 A | 9/1984 | Bose et al. |
| 4,532,873 A | 8/1985 | Rivers et al. |
| 4,612,123 A | * 9/1986 | Eustachio et al. .......... 210/709 |
| 4,619,210 A | 10/1986 | Kennedy |
| 4,660,586 A | 4/1987 | Knapp et al. |
| 4,669,397 A | 6/1987 | Galgana et al. |
| 4,715,763 A | 12/1987 | Galgana et al. |
| 4,718,359 A | 1/1988 | Skoog |
| 4,750,437 A | 6/1988 | Rouse |
| 4,753,181 A | 6/1988 | Sosnowski |
| 4,917,733 A | 4/1990 | Hansen |
| 4,993,331 A | 2/1991 | White et al. |
| 4,997,081 A | 3/1991 | Sutin |
| 5,046,435 A | * 9/1991 | Kugler ....................... 110/346 |
| 5,052,310 A | 10/1991 | Goff et al. |
| 5,078,065 A | 1/1992 | Tsunemi et al. |

(List continued on next page.)

Primary Examiner—Ira S. Lazarus
Assistant Examiner—K. B. Rinehart
(74) Attorney, Agent, or Firm—Hoffman & Baron, LLP

(57) ABSTRACT

A system and method for treating, injecting and co-combusting sludge in a municipal waste or other solid fuel combustor. The system includes a sludge receiving and treatment module and a sludge injection and combustion module. The sludge is received and stored in one or more storage hoppers where its moisture content is monitored and varied to obtain a sludge having a desired moisture content. The treated sludge is then pumped to a furnace injection nozzle where it is preferably atomized with steam and sprayed into the combustion zone of the furnace. Improved odor control in sludge handling is also provided by a storage tank and a sludge tanker trailer each having an air diffuser for mixing and aerating the sludge and a filter system for filtering odors.

28 Claims, 3 Drawing Sheets

U.S. PATENT DOCUMENTS

| | | |
|---|---|---|
| 5,094,177 A | 3/1992 | Lado |
| 5,186,111 A | 2/1993 | Baria |
| 5,205,227 A | 4/1993 | Khinkis et al. |
| 5,266,085 A | 11/1993 | McMahon et al. |
| 5,269,234 A | 12/1993 | Powell |
| 5,273,556 A | 12/1993 | McMahon et al. |
| 5,284,405 A * | 2/1994 | Carpenter .................. 406/194 |
| 5,405,537 A | 4/1995 | Goff et al. |
| 5,531,169 A | 7/1996 | Mole et al. |
| 5,544,598 A | 8/1996 | Guibelin et al. |
| 5,562,832 A | 10/1996 | McOnie et al. |
| 5,634,412 A | 6/1997 | Martin et al. |
| 5,711,235 A | 1/1998 | May et al. |
| 5,725,770 A | 3/1998 | Henry |
| 5,922,103 A | 7/1999 | Schwab et al. |
| 5,957,064 A * | 9/1999 | Barry et al. ................. 110/188 |
| 5,996,512 A | 12/1999 | Morin et al. |

\* cited by examiner

CO-COMBUSTION OF WASTE SLUDGE IN MUNICIPAL WASTE COMBUSTORS AND OTHER FURNACES

CROSS-REFERENCE TO RELATED APPLICATIONS

This application is a Continuation-in-Part of U.S. Application No. 09/420,291, filed Oct. 18, 1999 now U.S. Pat. No. 6,279,493, which claims the benefit of U.S. Provisional Application No. 60/104,806, filed Oct. 19,1998.

BACKGROUND OF THE INVENTION

1. Field of the Invention

This invention pertains to municipal solid waste combustors (MWCs) and, by extension, to all solid fuel steam power generation boilers and other furnaces. It involves odor free handling and disposal by thermal decomposition of waste sludges of variable solids content, including municipal sewage sludge, paper mill sludge, and other industrial sludges, in MWC power boilers and other furnaces which burn municipal solid waste or other solid fuels.

2. Background of the Related Art

As the options available for communities and industries for sludge disposal decline, a new cost-effective, environmentally sound method of disposal has become desperately needed. In the 1950s and 1960s, sludges were often incinerated in multiple hearth furnaces. However, most of those installations experienced poor combustion and produced extremely adverse air emissions. Accordingly, this approach was largely abandoned in favor of non-combustion disposal technologies.

Co-combustion of sludge, and preferably high carbon content sludge, with other fuels has remained a goal for many years. One approach, discussed repeatedly in technical literature, was to design external thermal drying systems for pre-drying sludge prior to injection into a furnace, so that drying sludge inside the furnace would not be necessary. However, this technology was expensive and even dangerous, because of potential health hazards related to inhalation of fugitive dust and dust explosions.

Other approaches described below involved injection of wet sludge into modern combustion processes. These approaches failed to achieve commercial acceptance of their technologies because of limited applicability, economic disadvantages or technological disadvantages. Additionally, conventional approaches did not address the problems of controlling odor in the handling and transporting of sludge prior to introduction into a furnace.

Komline et al. in U.S. Pat. No. 3,322,079 noted the synergy in co-combustion of sludge and municipal solid waste (MSW), using high temperature gases from combustion of MSW to dry sludge injected into the furnace by a rotary centrifugal atomizer. However, operating costs of such a system are high and the rotary centrifugal atomizer disclosed is difficult to reliably maintain because of plugging and wear. The rotary atomizer discharges a significant fraction of large particles that do not burn completely, and deposition of material on boiler internals becomes a problem.

Dingwell in U.S. Pat. No. 3,838,651 used steam to atomize waste oil in a burner designed to extend into a combustion chamber. However, this invention is limited in scope to waste oils in old-fashioned incinerators, which were not regulated as stringently at the time of invention. Partial combustion was acceptable and regulatory compliance was not identified as a goal. While steam was used for atomization, non-oil, i.e. aqueous, sludges were not considered.

Pan in U.S. Pat. No. 3,903,813 developed a device for injecting steam-atomized sludge into a combustion chamber in close proximity to an oil or gas burner. The injection device allows for mixing of a pressurized fluid and sludge in the same pipe, with the mixture exiting a restrictive orifice at the end of the injection pipe, such that the mixture is flashed to atmospheric pressure inside the furnace in the presence of oil or gas. Co-combustion with MSW and other renewable and fossil fuels is not considered and the device is intended for use primarily with sludges having solids content equal to or less than 5%. The point of sludge injection is limited to an area below an oil or gas burner flame. This device is intended for incineration of sludge only in the presence of an oil or gas burner.

Carpenter in U.S. Pat. No. 5,284,405 disclosed a method for entraining sludge particles in a stream of compressed combustion air, but the invention is limited to combustion within a rotary cement kiln. No attempt is made to burn sludge in suspension and regulatory compliance is not addressed.

Goff et al. in U.S. Pat. Nos. 5,052,310 and 5,405,537 established a sludge injection system for MWC's using oxygen-enriched air both to atomize sludge being sprayed into a furnace through a nozzle and to offset the loss of boiler efficiency from moisture in the sludge. However, this requires expensive construction of an oxygen-producing plant adjacent to an owner's core production facilities or purchase of large quantities of bottled oxygen. Furthermore, the invention is limited to MWC's only and may require modification to existing combustion air control systems.

Mole in U.S. Pat. No. 5,531,169 injects liquid waste material, primarily contaminated acid, immediately adjacent to a primary fuel burner. The primary purpose of the device is to dissociate acid molecules. The device is intended for air as opposed to steam atomization and the invention is directed to liquid hazardous waste disposal as opposed to sludge disposal and non-hazardous municipal solid waste combustion and conventional power generation.

Guibelin in U.S. Pat. No. 5,544,598 developed a nozzle for disposal of slurry, such as pasty or fatty wastes, by spraying onto burning municipal solid waste. However, this device does not involve sludge, and it is not designed for atomizing particles to burn in suspension.

An objective of the present invention is to provide a sludge receiving and treatment system that is capable of handling sludges with a wide range of characteristics (including variable moisture and solids content) and delivering a consistent flow of sludge to the injection system. Previous systems were not designed for and did not address variable sludge consistencies and solids content.

It is also a goal of the present invention to avoid the material handling difficulties typically encountered with sludge having solids contents of 15% and higher.

A further purpose of the present invention is to maximize suspension burning of sludge particles, in order to virtually eliminate the need to burn larger sludge particles.

A still further goal of the present invention is to utilize wastewater, other industrial process liquid wastes, air pollution control slurries, or mixtures thereof, in a sludge pre-combustion treatment process.

Another goal of the present invention is to eliminate odor in the handling, treatment and burning of sludge.

SUMMARY OF THE INVENTION

The aforementioned purposes, goals and objectives are achieved by the present invention for treating and injecting sludge into a combustor, which substantially reduces or eliminates the shortcomings that limited commercial viability of prior techniques.

The present invention generally includes a sludge receiving and treatment module, a solids controller and a sludge injection and combustion module. The sludge receiving and treatment module receives and treats sludge by either adding a liquid selected from the group consisting of water, aqueous based solutions, plant wastewater, industrial process liquid waste, pollution control slurries and mixtures thereof, or by reducing the moisture content of said sludge, to obtain a sludge having a desired moisture content. The solids controller monitors and varies the moisture content of the treated sludge, while the sludge injection and combustion module injects the treated sludge into a combustion zone of a combustor having a primary solid fuel burning therein, wherein the treated sludge is burned in suspension within the combustion zone of the combustor. The combustor can be a municipal solid waste combustor, having municipal solid waste burning therein, or it can be any solid fuel steam power generation combustor.

Preferably, the sludge injection and combustion module includes an injection nozzle for atomizing and preheating the treated sludge with steam and spraying the atomized treated sludge into the combustion zone of the combustor. The injection nozzle preferably includes a discharge end configured to provide a helical shaped discharge of sludge from the nozzle.

The system further preferably includes a controller for monitoring the temperature within the combustor and for varying the amount of treated sludge injected into the combustor in response to temperature changes within the combustor. The sludge receiving and treatment module further preferably includes a hopper for receiving and storing the sludge and a mixer for receiving the sludge from the hopper and for receiving liquid from a liquid source. The sludge injection and combustion module further preferably includes a sludge tank for receiving and storing the treated sludge from the sludge receiving and treatment module and a pump in fluid communication with the sludge tank and the injection nozzle for delivering the sludge from the sludge tank to the injection nozzle.

The sludge tank preferably includes a level controller for monitoring the level of sludge within the sludge tank and generating a signal to the sludge receiving and treatment module to vary the amount of sludge received in the sludge tank to maintain a constant level of sludge within the sludge tank, a mixer for continuously agitating the sludge within the sludge tank, a discharge line for delivering the sludge from the sludge tank to the pump and a conditioner interposed in the discharge line for shredding the sludge before entering said pump. A recirculation line is preferably connected between the pump and the sludge tank for recirculating sludge back to the sludge tank and a recirculation control valve is connected to the recirculation line for controlling a flow of sludge through the recirculation line. A flow controller is also preferably connected to the pump for monitoring the flow of sludge through the pump and generating a signal to the recirculation control valve to vary the amount of sludge flowing through the recirculation line.

In a method for co-combusting sludge within a combustor according to the present invention, a received sludge is first treated either by adding a liquid selected from the group consisting of water, aqueous based solutions, plant wastewater, industrial process liquid waste, pollution control slurries and mixtures thereof, or by reducing the moisture content of the received sludge, to obtain a sludge having a desired moisture content. The solids content of the treated sludge is monitored utilizing a solids controller and the moisture content is varied in response to solids content changes of the treated sludge. The sludge is then injected into a combustion zone of a combustor having a primary solid fuel burning therein where it is burned in suspension within the combustion zone of the combustor.

Preferably, the method further includes the steps of atomizing the treated sludge with steam prior to injection into the combustion zone, monitoring the temperature within the combustor and varying the amount of treated sludge injected into the combustor in response to temperature changes within the combustor to control combustor temperature.

The present invention further provides a sludge handling system having improved odor control. The system generally includes a sludge receiving storage tank, which receives sludge by pipeline or tanker trailer, and a sludge injection and combustion module for injecting the sludge from the storage tank into a combustion zone of a combustor. The sludge receiving storage tank includes an air diffuser for mixing and aerating the sludge within the tank for odor control. The storage tank further preferably includes a vent header having a filter system for controlling odors from the air vented from the vent header.

For further improvement of odor control when the sludge is delivered by tanker trailer, the present invention includes a sludge tanker trailer having an air diffuser for mixing and aerating sludge within the trailer. The sludge tanker trailer further preferably includes a vent header having a filter system for controlling odors from the air vented from the sludge tanker trailer by the vent header. The sludge tanker trailer also preferably includes a level transmitter for indicating the level of sludge within the trailer and an air blower for providing fresh air into the trailer thereby providing a positive air pressure within the trailer for pneumatic unloading of sludge. A diffuser header is also preferably connected to the air diffuser and a source of tractor engine exhaust is connected to the diffuser header for directing the tractor engine exhaust into the sludge tanker trailer through the air diffuser.

The steam atomization nozzle utilized in the present invention is specially engineered to allow flash drying and maximum particle size reduction upon contact with the atomizing steam prior to injection into the furnace. This allows for near complete combustion, little or no impact on bottom ash quality and burnout, and treatment of virtually all products of sludge combustion in existing air pollution control systems. Previous inventions did not address the goal of suspension burning or compliance with air pollution regulations.

The present invention is designed to allow delivery, modification, and control of solids content both to maximize the number of potential sludge customers and to stabilize furnace temperature in response to fluctuating primary fuel heating value.

For MWCs, MSW heating value fluctuates seasonally and hour-to-hour, depending on the source of solid waste deliveries. The present invention allows for manual adjustment of sludge characteristics, including solids and carbon content, and flow rate to maintain relatively constant temperature in the furnace resulting in smoother steam generation. Moreover, because the average heating value of MSW has increased significantly since many MWC's were designed, solid waste through-put has been limited by the higher heating value of the fuel. Since solid waste is a major source of revenue for a MWC, reduced through-put capacity can result in reduced revenue. The disclosed method allows for maintaining MWC through-put revenues at higher than design MSW heating value.

For all industrial combustion facilities, the present invention can dispose of plant wastewater and other industrial process liquid wastes, as well as reduce overall air pollution control costs.

For industrial sludge producers such as paper mills and other similar installations, the present invention makes it possible to achieve environmentally sound on-site or local sludge disposal using existing conventional solid fuel steam boilers, as opposed to continuously increasing sludge hauling and disposal costs to controlled landfills.

The preferred embodiments of the sludge treatment and injection system, as well as other objects, features and advantages of this invention, will be apparent from the following detailed description, which is to be read in conjunction with the accompanying drawings.

DETAILED DESCRIPTION OF THE PREFERRED EMBODIMENTS

Figure 1:
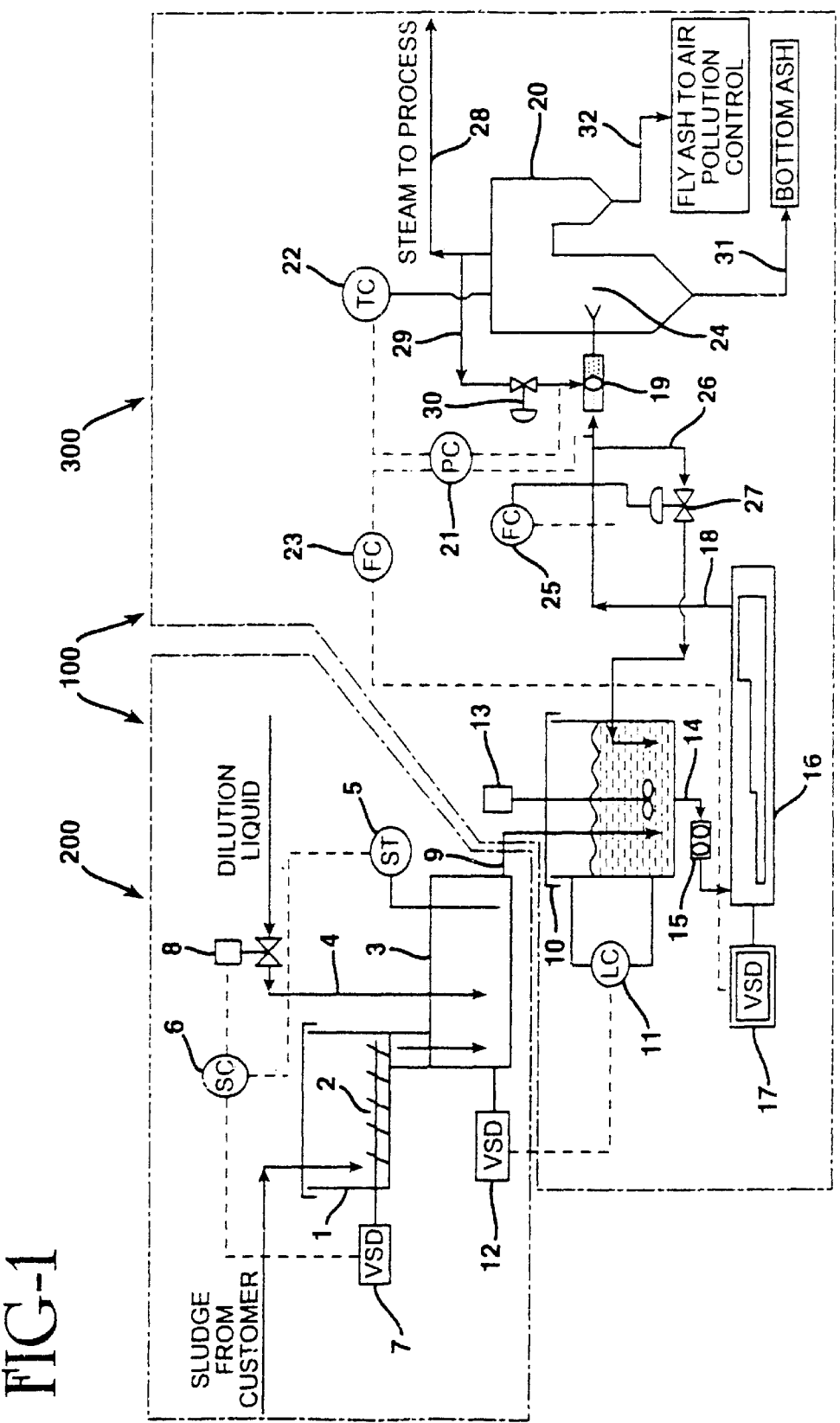
FIG. 1 is a schematic diagram of a sludge treatment and injection system formed in accordance with the present invention.

Referring to FIG. 1, a sludge treatment and injection system 100 generally includes two modules: a sludge receiving and treatment module 200; and a sludge injection and combustion module 300. It is contemplated that the sludge receiving and treatment module 200 may be physically separate from the injection and combustion module 300. It is also conceivable that all or portions of the sludge receiving and treatment module 200 may be incorporated within the mode of shipping sludge, such as by specialized trucks which treat and pre-mix sludge in transit. However, the system 100 illustrated in FIG. 1 includes both modules on-site with a municipal waste combustor (MWC), power boiler or other furnace.

In the system 100 shown in FIG. 1, sludge is shipped to the receiving and treatment module 200 in any conventional manner, such as by truck or by pipeline. When shipped by truck, the sludge may be processed in a batch-mode or may be stored until a sufficient amount is available for a semi-continuous type operation. When sludge is delivered in a continuous fashion, such as by pipeline, the system can be easily adapted to operate in a continuous processing mode.

In either mode, incoming sludge with variable moisture content, typically in the range of about 5% to 50% solids content, preferably in the range of about 15% to 45%, is received in enclosed hopper 1 where it is treated to obtain a sludge having a desired solids content. Preferably, the design of enclosed hopper 1 allows for sludge delivery and storage in an odor-free and hands-off manner. Multiple hoppers with overflow provisions may be provided depending on the amount of sludge input and whether a continuous or a batch process is utilized. Variable speed screw conveyor 2 at the bottom of hopper 1 delivers sludge to variable speed rotating drum mixer 3. Drum mixer 3 can also receive a dilution liquid, which may include water, plant wastewater, other industrial process liquid wastes, air pollution control slurries, or mixtures thereof, through line 4 and can also receive additional solids to increase the solids content of the received sludge. Solids content transmitter 5 provides continuous read-out to solids controller 6, a control panel set by an operator to control the amount of received sludge added to drum mixer 3 from screw conveyor 2, by adjusting the speed of variable speed drive 7 and the amount, if any, of additional solids to be added to drum mixer 3. Solids controller 6 also opens and closes dilution valve 8 as required to add a dilution liquid to achieve the desired solids content in drum mixer 3. The optimal desired solids content of the sludge is about 10% but may range between about 5% and 15% after treatment. It has been found that this range provides maximum ease of handling while at the same time allows effective sludge combustion. Received sludges having a 5% to 15% solids content may be able to bypass the mixer 3 and be discharged directly from the hopper 1 to a sludge pump suction tank 10.

Metering and mixing in drum mixer 3 is preferably a batch process in that incoming sludge can be mixed with a dilution liquid or additional solids to a desired solids content before moving to the next step of the system. This allows maximum flexibility in establishing the desired solids content from the widest possible range of incoming sludge characteristics.

For example, there may be periods when the average heating value of the MSW is lower than normal. This usually occurs during periods of heavy rainfall causing higher moisture content in the MSW. During such periods, it may be beneficial for furnace temperature stabilization to inject sludge mixture with a higher heating value. The present invention allows for manual adjustment to increase the sludge heating value. This is achieved by mixing the sludge to a higher solids content and/or by using as part or all of the sludge mixture, a higher carbon content sludge, such as high fiber paper mill sludge that would be received and separately stored in one or more of the storage hoppers.

Variable speed rotating drum mixer 3 operates in a manner similar to a cement mixer in that the agitating action of the rotating drum mixer 3 reduces particle size and facilitates mixing of the sludge into a homogenous fluid suitable for pumping. When the desired solids content is achieved in drum mixer 3, it discharges through line 9 into enclosed sludge pump suction tank 10.

Sludge pump suction tank 10 stores the desired sludge mixture prior to injection into the furnace. The size of the tank is determined by the operating parameters of the particular furnace and whether a batch or continuous process is utilized. Sludge pump suction tank 10 includes a level controller 11 which controls variable speed drive 12 of the drum mixer 3 to adjust the flow rate leaving drum mixer 3 in order to maintain a constant level in sludge pump suction tank 10. Sludge pump suction tank 10 also includes a mixer 13 which continuously agitates the sludge to prevent the sludge from settling or congealing and to thereby maintain a homogenous fluid state.

Sludge is drawn out the bottom of suction tank 10 through line 14 into a conditioner 15 which chops up and shears any large pieces of material before entering a variable speed progressive cavity pump 16. (In another embodiment, where sludge is pumped directly from the customer or from delivery trucks, the conditioner may be moved or an additional conditioner may be placed in the receiving line to minimize the risk of large particle contaminants coming from the customer.) One feature of the present invention is the relative ease with which the treated sludge flows, which allows for the use of a progressive cavity pump. Conventional systems, pumping sludge with higher solids content, i.e. over 15% to 25%, require heavy duty piston pumps or reciprocating pumps which are more expensive and also difficult to maintain. The progressive cavity pump 16 of the present invention provides cost-effective and easy handling of sludge having solids content up to about 15%.

Pump 16 is driven by variable speed drive 17 and discharges through line 18 to either feed recirculation line 26 back to suction tank 10 or to feed sludge atomizing nozzle 19 for injection into the combustion zone 24 of the furnace 20.

The purpose of recirculation line 26 is to maintain adequate flow through pump 16, in accordance with the pump manufacturer's specification, while avoiding excessive pressure build-up in line 18 to the furnace 20 when sludge demand to the furnace is low. With certain pumps, if flow through the pump is too low, the pump may overheat. Additionally, recirculation back into suction tank 10 also helps to continuously agitate the sludge when not flowing to the furnace. Although preferred, the recirculation line 26 may be eliminated if the pump 16 possesses some form of minimum flow rate and maximum pressure control and the suction tank 10 adequately keeps the sludge agitated without recirculation.

Recirculation line 26 includes a flow controller 25, which modulates recirculation control valve 27 to ensure the proper minimum flow and to stabilize nozzle sludge pressure. When the demand for sludge injection into the furnace 20 is low, flow controller 25 opens recirculation control valve 27 to allow the sludge to recirculate back into suction tank 10 to maintain minimum flow rates and stable pressure, thereby preventing overheating of pump 16.

Sludge flow to the furnace 20 is controlled by programmable controller 21 in response to a demand signal from furnace temperature controller 22, based on furnace flue gas temperature. As furnace temperature rises above a set point established by programmable controller 21, flow controller 23 modulates the speed of variable speed drive 17, which controls the speed of pump 16 and the flow of sludge to nozzle 19 where it is preferably atomized with steam and sprayed into the combustion zone 24 of furnace 20.

While other injection methods may be utilized, steam atomization is preferred because the high temperature steam has the effect of preheating the sludge and also dispersing the sludge into fine particles for nearly complete combustion in suspension. It is also contemplated that with advances in pumping technology and/or by pre-heating and thereby reducing the viscosity of the sludge, higher solids content sludge may be pumped through the system all the way to the injection nozzle. In this case, the atomization steam could act as a dilution medium whereby prior treatment of the sludge would not be necessary. Thus, with steam atomization, treatment of the sludge could occur later at the injection nozzle as opposed to the sludge receiving and treatment module.

As illustrated in FIG. 1, steam is piped from steam header 28 through line 29 to pressure control valve 30. In furnace systems which do not involve internal steam generation, steam may be provided from an external source. In either system, a programmable controller 21 modulates pressure control valve 30 to maintain a set differential pressure between steam and sludge at nozzle 19. Tests have shown that optimum differential pressure depends on solids content and other sludge characteristics. For example, it has been found that for sludge having about 10% solids content, a minimum steam pressure of 50 psig, and a minimum sludge pressure of 25 psig, at the nozzle results in sustainable atomized sludge flow at a flow rate of about 3 gallons per minute. To achieve higher flow rates, higher pressures at the nozzle are utilized. As a result, sludge disposal rates of up to 5% dry solids to MSW disposal capacity can be achieved.

Sludge injection nozzle 19 is specially chosen for its ability to inject steam into the sludge stream before the discharge point of the nozzle. This allows for preheating and partial flash drying of sludge and sets the stage for additional energy release at the point of nozzle discharge. This design specifically minimizes sludge particle size to ensure nearly complete suspension burning in the combustion zone 24 of furnace 20. Previous inventions allowed some fraction of large sludge particles to drop into the bottom ash system 31. Larger particles tend to burn incompletely, resulting in elevated levels of unburned material in bottom ash, which could result in adverse chemical composition of the bottom ash, when tested for compliance with environmental regulations. Suspension burning ensures nearly complete combustion of each sludge particle, with fly ash leaving furnace 20 at duct 32 for transport to the air pollution control system, which is designed to handle all fly ash products of combustion in full regulatory compliance.

Sludge injection nozzle 19 is also specially engineered with a large free cross-sectional area preferably at least 0.365 square inches to minimize plugging potential. It also preferably features a protruding corkscrew at the discharge end which results in a helical discharge at the nozzle. Accordingly, the helical discharge of superheated sludge has a circular velocity as opposed to a linear projection to better dissipate kinetic energy at the nozzle and to prevent impingement of sludge particles on furnace internals thereby further enhancing suspension burning of sludge particles. A preferred sludge atomization nozzle is the Bete Model No. SA 2100 which is commercially available from Bete Fog Nozzle Inc., of Greenfield, Mass.

Location of the sludge injection point depends on the sludge characteristics of the individual application and the design of the furnace. The sludge injection system is designed for flexibility of application. Accordingly, injection point location is guided by problem-solving potential within the constraints of good combustion practice, such as residence time, furnace exit temperature, and complete turbulence.

The sludge treatment and injection system of the present invention is designed for simplicity of interface with an existing furnace combustion control system. Relays are provided in programmable controller 21 for establishing steam flow before sludge flow, and for automatic shutoff of sludge flow in the event of upsets such as low steam flow in the nozzle or a boiler fuel trip. No air is added with the sludge, so detailed interfaces with combustion air controls system are not required. Heat from the atomizing steam plus the heating value of the sludge tends to offset the heat lost to evaporating liquids in the sludge. Therefore, existing combustion air controls require only a small bias or no compensation at all when the sludge injection system is operating.

One aspect of the present invention is its ability to take the counterintuitive approach of increasing moisture content of incoming sludge. Increased moisture allows better and more cost-effective handling of the sludge through the system. Moreover, the resulting cooling effect from injecting high moisture content sludge into a municipal waste combustion furnace can be countered by increasing the input of municipal solid waste. The resulting cooling effect can also be countered by increasing turbulence in the furnace and utilizing oxygen that would be lost because of under-agitated turbulence. Thus, controlling the furnace temperature in this manner allows for increased solid waste input, which in turn increases revenues for the MWC facility.

Additionally, lowering the furnace flame temperature by injecting high moisture content sludge has the surprising effect of significantly reducing the level of $NO_x$ emissions from the furnace. Thus, the present invention also has the potential as a revenue producing air pollution control system for $NO_x$ reduction.

The sludge treatment and injection system is not limited by any type of boiler or fuel type, and it has the potential to open an entirely new route to solving difficult combustion-related problems. Mass burn MWC's often have slagging problems caused by high-temperature melting of ash. In this case, the sludge injection system can provide cooling in a critical area to reduce slagging. The sludge injection system can also minimize corrosion problems caused by localized high temperature chloride corrosion in refuse derived fuel MWC's by improving turbulence, mixing, and temperature control. Conventional fossil fuel boilers also experience slagging and corrosion in various forms and the sludge injection system can be applied to attack these problems as well. All boilers face increasingly strict air pollution control regulations. The sludge injection system also has the potential to provide a new method of emissions control while simultaneously solving a local sludge disposal problem.

EXAMPLE

A system according to the present invention was tested in which diluted paper and sewage sludge were injected into an operating conventional municipal waste combustor.

The combustor facility selected for testing has three mass burn refractory MWC's, each rated at 120 tons per day. Normal operation is with two combustors operating and one on stand-by. The combustors are tied to two waste heat boilers and associated air pollution control trains. Each air pollution control train consists of an electrostatic precipitator and spray absorber. The selected facility is permitted to burn up to 240 tons per day of municipal solid waste (MSW) and generates for sale up to 60,000 pounds per hour of super-heated steam at 230 psig and 500° F.

Minor modifications were made to the existing combustor facility to allow for receiving, diluting, mixing, storage and pumping of sludge. A plastic mixing tank having a capacity of 1800 gallons was installed at the facility and a Nemo progressive cavity pump with variable speed drive manufactured by Nietzsch was connected to the mixing tank. The pump used had a capacity of about 100 gallons per minute at a speed of 60 rpm. For this test, however, the speed was reduced to about 10 rpm to achieve the desired sludge flow. A sludge recirculation system was implemented wherein an amount of sludge could be recirculated back to the mixing tank from the pump discharge. During this test, pressure and flow control through the recirculation system were done manually. One of the facility's combustor units was also modified to allow spraying and steam atomization of the sludge into the combustor. A Bete Fog Nozzle (same Model #SA2100 as described above) was installed in the combustor as close as possible to the active burning zone and an injection panel was utilized to allow for control of steam header and nozzle pressure, sludge header and nozzle pressure, and sludge flow using a magnetic flow meter. The nozzle was chosen for its large flow area (0.365 $in^2$) to minimize the potential for plugging with sludge particles.

Sludge having a solids content of about 24–40% was received at the facility in drums and roll-off containers. The sludge was manually emptied into the mixing tank which had been pre-filled with an amount of water necessary to dilute this type of sludge to a desired final solids content. A propeller-type mixer was used to agitate and mix the sludge in the tank and the cavity pump was initially operated in a manual recirculation mode to further assist in breaking down lumps in the sludge.

Diluted sludges having solids contents ranging from 2% to about 12% were prepared and tested. It was concluded that a solids content of about 10% offered the best combination of handling characteristics and disposal characteristics in the furnace. Sludge flow rates from 4–20 GPM were tested with an optimum flow rate of 10 GPM being selected. The selected flow rate of 10 GPM represents a sludge disposal ratio of 5% dry solids to MSW disposal capacity at the facility. This level demonstrates the ability to co-dispose of all the solid wastes and sewage sludge generated in a typical community.

Diluted sludge was pumped through the cavity pump to the injection nozzle at a pressure in the range of 15–25 psig where it was atomized with steam supplied to the nozzle at a temperature of about 390 F. and a pressure running in a range similar to the sludge pressure. The onset of sludge injection into the combustor was anticipated by increasing the furnace temperature a few degrees for a short period of time prior to injection. This was accomplished by increasing the MSW feed rate slightly to add more heat within the combustor.

Test data were collected using existing plant instrumentation. Data collection stations were established at the main control room, the sludge mixing and pumping station, the sludge injection station, and the continuous emission monitoring room. Visual observations of the primary combustor conditions were possible using infrared cameras and monitors located in the main control room. The infrared technology was especially helpful in judging atomization quality inside the combustor. Bottom ash samples were taken at the end of each test run from the burn-out grate just before deposition into the wet bottom ash handling system. Samples were taken from the top of the ash bed to reflect worst case conditions.

During sludge injection, the infrared cameras positioned within the primary combustor detected white spots on the MSW burning grate and an increase in turbulence within the combustor. The burning MSW appeared to brighten upon sludge injection indicating that the turbulence caused by the injected sludge was creating better mixing and therefore better combustion conditions in the furnace. It is believed that less excess oxygen was required while burning the sludge because turbulence in the furnace created by the injection system may have resulted in more efficient use of the excess air in the chamber. Furthermore, there was no noticeable effect on furnace draft as the diluted sludge was injected into the combustor.

Throughout the entire testing program, there were no detectable amounts of sulfur dioxide ($SO_2$) in stack emissions with or without sludge co-combustion. Similarly, test results showed that carbon monoxide (CO) emissions remained at virtually zero with or without sludge co-combustion. This is important because the absence of CO is a primary indicator of good combustion conditions with no dioxin emissions. Occasional small spikes of CO emissions could be observed from time to time, but these spikes never approached the facility's permit level and were typical of spikes observed when burning 100% MSW. Therefore, there was no impact with regard to $SO_2$ or CO emissions when co-combusting sludge.

Surprisingly however, initial testing of various sludge parameters showed an immediate and consistent reduction in nitrous oxide ($NO_x$) emissions. It is well known that $NO_x$ emissions can be reduced by lowering flame temperature. However, such a reduction can also cause an increase in CO due to poor combustion. Therefore, good combustion is contained in an envelope where both $NO_x$ and CO emissions are minimized. Because CO emissions remained close to zero through all sludge injection testing, the $NO_x$ reductions resulting from this test program were considered significant. A summary of these test results is set forth below in Table 1.

TABLE 1

Summary of $NO_x$ Reductions

| Test Number | Average $NO_x$ w/o Injection, Lb/MMbtu | Calculated $NO_x$ From Test Unit, Lb/MMbtu | Calculated $NO_x$ Reduction (%) |
| --- | --- | --- | --- |
| 1 | 0.229 | 0.185 | 19 |
| 2 | 0.229 | 0.169 | 26 |
| 3 | 0.229 | 0.173 | 24 |
| 4 | 0.229 | 0.174 | 24 |
| 5 | 0.229 | 0.217 | 5 |
| 6 | 0.229 | 0.145 | 37 |

Similar testing of particulate, metals and dioxins/furans emissions revealed emission rates all lower than permit parameters. Ash samples were also collected during the demonstration to determine the impact on ash quality from co-combustion of MSW with sludge. The results were very consistent and showed only a slight increase in loss-on-ignition, from an average of 1.1% to 1.2%, which is extremely low and indicative of good combustion.

In sum, the test program showed that the present invention is an efficient sludge disposal system which is also capable of operating as a furnace temperature control system with no adverse impacts on plant operation, air emissions or ash quality. The test program showed that injecting and co-combusting sludge within a municipal solid waste combustor has the advantage of balancing the heat value of the municipal solid waste thereby allowing increased throughput of MSW to an MWC. Additionally, apparent reductions in $NO_x$ emissions were achieved.

Figure 2:
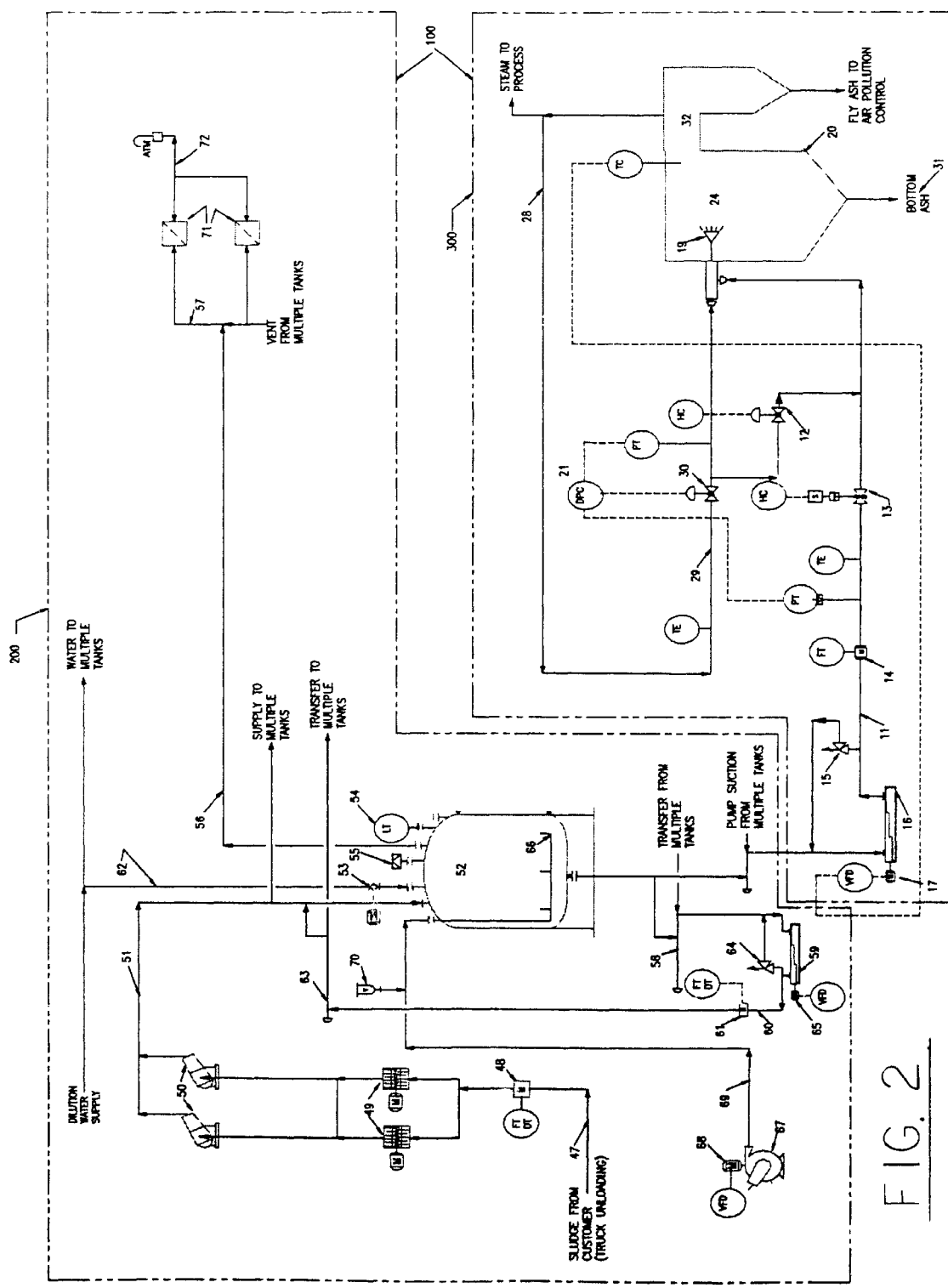
FIG. 2 is a schematic diagram of a preferred embodiment of the sludge treatment and injection system formed in accordance with the present invention.

A preferred embodiment of the present invention is shown in FIG. 2. Whereas the embodiment shown in FIG. 1 provides for receiving, storage and treatment of sludge received from conventional dump trucks that generally do not adequately contain odors, the preferred system 100' shown in FIG. 2 provides specially designed features for odor-free operation.

The preferred system 100' shown in FIG. 2 includes a similar sludge injection and combustion module 300, as described above, and many other common components. Accordingly, common components have been designated the same reference numerals. However, the system 100' shown in FIG. 2 includes a sludge receiving and treatment module 200' having additional features for minimizing odor during the sludge receiving and treatment processes.

Again, sludge is shipped to the receiving and treatment module 200' in any conventional manner, such as by truck or by pipeline, and enters module 200' through line 47. Flow and sludge solids content are measured by a magnetic flow meter 48, manufactured by Krohne. Sludge particle size is reduced by conditioners or grinders 49 and can be thickened by centrifuges 50, if necessary to achieve the final sludge solids content of 10% to 15%. Alternatives to centrifuges 50 for thickening include belt filter presses, vacuum filter presses, and gravity belt thickeners, depending on the co-combustion facility's perception of local market needs.

Sludge is then delivered through a tank header line 51 to at least one storage tank 52, equipped with a level transmitter 54, a rupture disc 55 and a vent line 56, which leads to a common vent header 57. Preferably, there are at least two tanks 52, one for receiving and mixing, and one for active feed to the injection and combustion module 300. Sludge in the mixing tank 52 is circulated through line 58 to a sludge transfer pump 59, which is driven by a variable speed motor 65 and discharges through line 60 to a Coriolis density meter 61, manufactured by Krohne. The density meter 61 measures solids content in the mixing tank 52. The sludge transfer pump 59 is equipped with a safety relief valve 64 to protect the pump in the event of a low flow situation. When solids content reaches the desired level by adding either thickened sludge through the centrifuges 50 or dilution water through line 62 and water valve 53, sludge transfer pump 59 is used to transfer sludge to an active combustor module feed tank 52 through sludge transfer header 63.

Mixing in the mixing tank 52 is accomplished by a diffuser system 66 attached to the bottom of the tank. Air is metered into the diffuser system 66 by a diffuser blower 67, which is driven by a variable speed motor 68. The diffuser blower 67 discharges through line 69 to the diffuser system 66. The diffuser line 69 is preferably equipped with a vacuum breaker 70. The air diffusion system 66 provides both mixing in the tank and aeration for primary odor control. Each tank is vented through line 56 to common vent header 57, which is connected to filter systems 71, which provide secondary odor control. Filter systems 71 are preferably carbon-based systems, and more preferably are activated carbon-based odor control systems that filter odors from the air vented from the vent header 57. Venting to atmosphere through line 72 is reduced when sludge is being fed to a combustor from an active sludge feed tank in parallel with a mixing tank because air displaced by filling the mixing tank is offset by air drawn into the feed tank that is simultaneously supplying a combustor.

Figure 3:
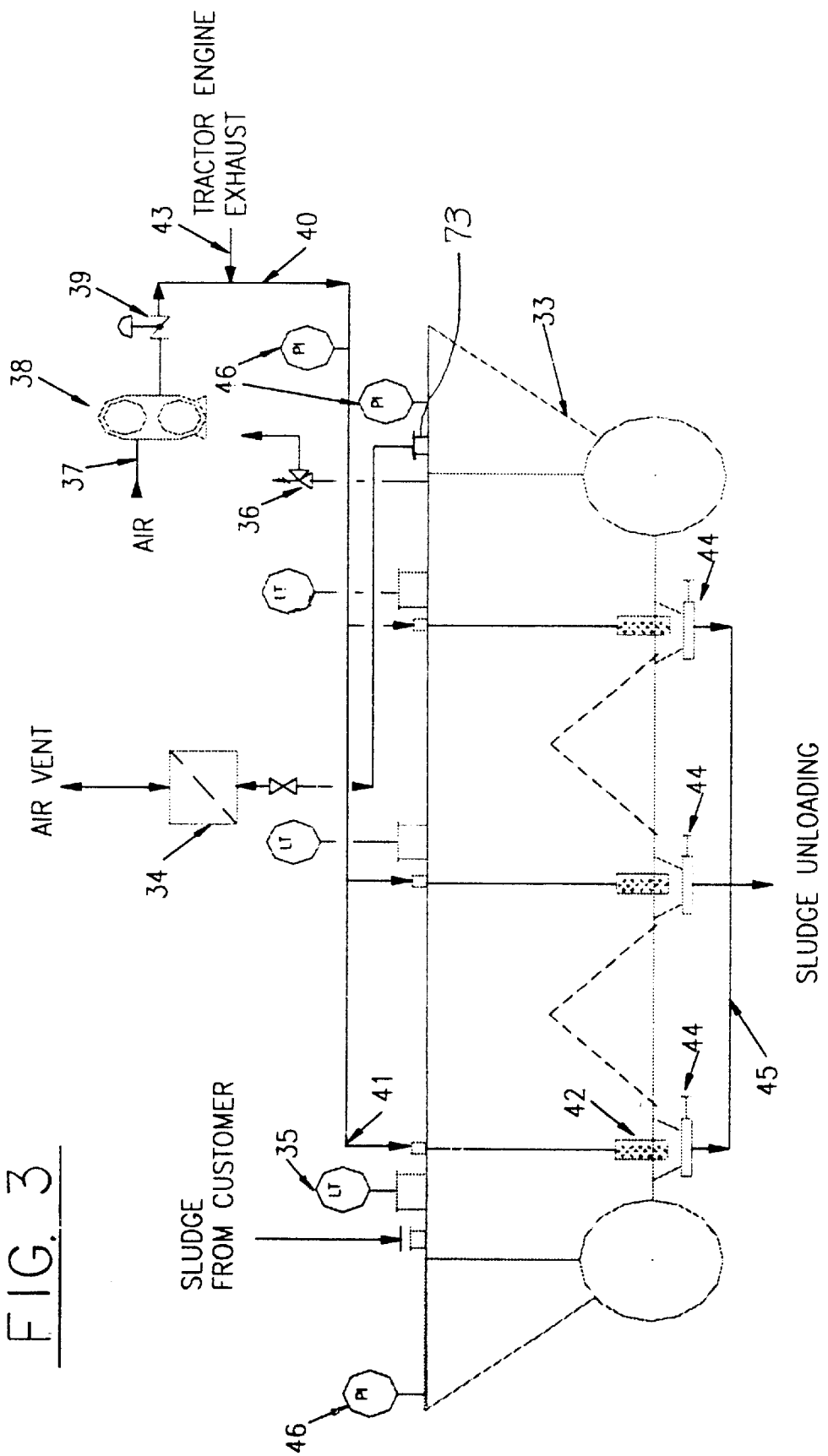
FIG. 3 is a schematic diagram of a preferred sludge tanker trailer formed in accordance with the present invention.

If the sludge is to be delivered by trailer rather than by pipeline, a specially designed sludge tanker trailer 33 is preferably provided, as shown in FIG. 3, to further minimize odors during sludge transport and receiving. The trailer 33 can be used to receive, transport and unload sludge to either system 100 shown in FIG. 1 or system 100' shown in FIG. 2. Referring to FIG. 3, sludge is unloaded directly from a customer's discharge point into tanker trailer 33. The trailer 33 is designed for total flexibility from the customer's point of view, with capability for loading dewatered sludge by conveyor, or diluted sludge by pump, into tanker trailer 33. Air displaced from the trailer 33 during loading operations is vented out a vent header 73 through a filter system 34 for odor control. Filter system 34 is preferably a carbon-based system, and more preferably an activated carbon-based odor control system that filters odors from the air vented from the vent header 73.

Level transmitters 35 provide sludge level indication to the operator as sludge is loaded at the customer's discharge point and unloaded at the co-combustion facility. A pressure relief valve 36 provides safety pressure relief for the tanker trailer pressure vessel.

Fresh air is drawn in through line 37 by a blower 38 both for odor control and for pneumatic unloading of sludge. The blower 38 can be tractor-mounted or trailer-mounted and can be driven by a stand-alone diesel engine or by power takeoff from the tractor hydraulic system. Air can also be provided by a central blower located at the co-combustion facility. This option would reduce the cost of each trailer, but would limit the amount of mixing that could be performed during loading and during transit. Air flow is controlled by a valve 39 and flows through an air diffuser header 40 into multiple connections at the top of the trailer 33. Pressure indicators 46 provide operator indication of proper operating air pressure. Air flows through diffuser pipes 41 to coarse bubble diffusers 42. As air is discharged from coarse bubble diffusers 42, sludge in the tank is both mixed by the agitating action of the air bubbles and aerated for odor control. Tractor engine exhaust can be directed through line 43 to the air diffuser header 40 both for cold weather heating of the sludge and for air pollution control of diesel particulate emissions. By extension, this feature applies to all diesel emission strategies using a viscous fluid for particulate capture and gaseous pollutant capture by reaction with the sludge.

Sludge is unloaded at the receiving, treatment and storage module 200 or 200' by closing off the carbon filter 34 and opening hopper discharge valves 44 one at a time to an unloading header 45. The blower 38 discharges air into the tank vessel through lines 40 and 41 and coarse bubble diffusers 42. As air pressure builds up inside the trailer 33, sludge is discharged through header 45 to the receiving and treatment module 200 or 200' (FIG. 1 or 3). As a result, sludge can be transported and unloaded to a sludge receiving station in a relatively odor free manner.

Although the preferred embodiments of the present invention have been described with reference to the accompanying drawings, it is to be understood that the invention is not limited to those precise embodiments, and that other changes and modifications may be made by one skilled in the art without departing from the scope or spirit of the invention.

What is claimed is:

1. A system for co-combusting sludge within a combustor, comprising:
    a sludge receiving and treatment module for receiving and treating sludge, by adding a liquid selected from the group consisting of water, aqueous based solutions, plant wastewater, industrial process liquid waste, pollution control slurries and mixtures thereof, or by adding additional solids to said sludge, to obtain a sludge having a desired solids content;
    a solids controller for monitoring and varying said solids content of said treated sludge; and
    a sludge injection and combustion module for injecting said treated sludge into a combustion zone of a combustor having a primary solid fuel burning therein, wherein said treated sludge is burned in suspension within said combustion zone of said combuster.

2. The system as defined in claim 1, wherein said sludge injection and combustion module includes an injection nozzle for atomizing said treated sludge with steam and spraying said atomized treated sludge into said combustion zone of said combustor.

3. The system as defined in claim 1, wherein said combustor is a municipal solid waste combustor and said treated sludge is burned in suspension above municipal solid waste burning therein.

4. The system as defined in claim 1, further comprising a controller for monitoring the temperature within said combustor and for varying the amount of treated sludge injected into said combustor in response to temperature changes within said combustor.

5. The system as defined in claim 1, wherein said sludge receiving and treatment module comprises:
    a hopper for receiving and storing said sludge; and
    a mixer for receiving said sludge from said hopper and for receiving either said liquid from a liquid source or a solid from a solid source, said mixer mixing said sludge with said liquid or said solid thereby treating said sludge to obtain a sludge having a desired moisture content.

6. The system as defined in claim 2, wherein said sludge injection and combustion module further comprises:
    a sludge tank for receiving and storing said treated sludge from said sludge receiving and treatment module; and
    a pump in fluid communication with said sludge tank and said injection nozzle for delivering said sludge from said sludge tank to said injection nozzle.

7. A system for co-combusting sludge within a combustor, comprising:
    a sludge receiving and treatment module for receiving and treating sludge, by adding a liquid selected from the group consisting of water, aqueous based solutions, plant wastewater, industrial process liquid waste, pollution control slurries and mixtures thereof, or by reducing the moisture content of said sludge, to obtain a sludge having a desired moisture content;
    a solids controller for monitoring and varying said moisture content of said treated sludge; and
    a sludge injection and combustion module for injecting said treated sludge into a combustion zone of a combustor having a primary solid fuel burning therein, wherein said treated sludge is burned in suspension within said combustion zone of said combustor, and wherein said sludge injection and combustion module includes an injection nozzle for atomizing said treated sludge with steam and spraying said atomized treated sludge into said combustion zone of said combustor, a sludge tank for receiving and storing said treated sludge from said sludge receiving and treatment module and a pump in fluid communication with said sludge tank and said injection nozzle for delivering said sludge from said sludge tank to said injection nozzle, wherein said sludge tank includes a level controller for monitoring the level of sludge within said sludge tank and generating a signal to said sludge receiving and treatment module to vary the amount of sludge received in said sludge tank to maintain a constant level of sludge within said sludge tank, a mixer for continuously agitating said sludge within said sludge tank. a discharge line for delivering said sludge from said sludge tank to said pump; and a conditioner interposed in said discharge line for shredding said sludge before entering said pump.

8. A system for co-combusting sludge within a combustor, comprising:
    a sludge receiving and treatment module for receiving and treating sludge, by adding a liquid selected from the group consisting of water, aqueous based solutions, plant wastewater, industrial process liquid waste, pollution control slurries and mixtures thereof, or by reducing the moisture content of said sludge, to obtain a sludge having a desired moisture content;

a solids controller for monitoring and varying said moisture content of said treated sludge; and a sludge injection and combustion module for injecting said treated sludge into a combustion zone of a combustor having a primary solid fuel burning therein, wherein said treated sludge is burned in suspension within said combustion zone of said combustor, and wherein said sludge injection and combustion module includes an injection nozzle for atomizing said treated sludge with steam and spraying said atomized treated sludge into said combustion zone of said combustor, a sludge tank for receiving and storing said treated sludge from said sludge receiving and treatment module, a pump in fluid communication with said sludge tank and said injection nozzle for delivering said sludge from said sludge tank to said injection nozzle, a recirculation line connected between said pump and said sludge tank for recirculating sludge back to said sludge tank, a recirculation control valve connected to said recirculation line for controlling a flow of sludge through said recirculation line and a flow controller connected to said pump for monitoring the flow of sludge through said pump and generating a signal to said recirculation control valve to vary the amount of sludge flowing through said recirculation line.

9. A system for co-combusting sludge within a combustor, comprising:

a sludge receiving and treatment module for receiving and treating sludge, by adding a liquid selected from the group consisting of water, aqueous based solutions, plant wastewater, industrial process liquid waste, pollution control slurries and mixtures thereof, or by reducing the moisture content of said sludge, to obtain a sludge having a desired moisture content;

a solids controller for monitoring and varying said moisture content of said treated sludge; and a sludge injection and combustion module for injecting said treated sludge into a combustion zone of a combustor having a primary solid fuel burning therein, wherein said treated sludge is burned in suspension within said combustion zone of said combustor, and wherein said sludge injection and combustion module includes an injection nozzle for atomizing said treated sludge with steam and spraying said atomized treated sludge into said combustion zone of said combustor, a sludge tank for receiving and storing said treated sludge from said sludge receiving and treatment module, a pump in fluid communication with said sludge tank and said injection nozzle for delivering said sludge from said sludge tank to said injection nozzle, a temperature controller for monitoring the temperature within said combustor and generating a signal in response to temperature changes within said combustor and a pump driver connected to said pump for varying the flow of sludge through said pump in response to a signal received from said temperature controller.

10. The system as defined in claim 2, wherein said injection nozzle includes a discharge end for spraying said atomized treated sludge into said combustion zone of said combustor, and wherein said sludge is atomized and preheated with steam before being sprayed from said discharge end of said nozzle.

11. The system as defined in claim 10, wherein said discharge end of said injection nozzle is configured to provide a helical shaped discharge of sludge from said nozzle.

12. The system as defined in claim 1, wherein said combustor is a steam power generation combustor.

13. A method for co-combusting sludge within a combustor comprising the steps of:

receiving sludge having a solids content;

treating said received sludge, by adding a liquid selected from the group consisting of water, aqueous based solutions, plant wastewater, industrial process liquid waste, pollution control slurries and mixtures thereof, or by adding additional solids to said received sludge, to obtain a sludge having a desired solids content;

monitoring the solids content of said treated sludge utilizing a solids controller;

varying the solids content of said treated sludge in response to solids content changes of said treated sludge;

injecting said treated sludge into a combustion zone of a combustor having a primary solid fuel burning therein; and burning said treated sludge in suspension within said combustion zone of said combustor.

14. The method as defined in claim 13, further comprising the step of:

atomizing said treated sludge with steam prior to injection into said combustion zone.

15. The method as defined in claim 13, wherein said combustor is a municipal solid waste combustor and said treated sludge is burned in suspension above municipal solid waste burning therein.

16. The method as defined in claim 13, further comprising the steps of:

monitoring the temperature within said combustor; and varying the amount of treated sludge injected into said combustor in response to temperature changes within said combustor to control combustor temperature.

17. A system for combusting sludge within a combustor, comprising:

a storage tank for receiving sludge having a solids content, said storage tank including an air diffuser for metering air into said storage tank thereby mixing and aerating said sludge within said storage tank;

a solids controller for measuring and varying said solids content of said sludge in said storage tank; and a sludge injection and combustion module for injecting said sludge from said storage tank into a combustion zone of a combustor.

18. The system as defined in claim 17, wherein said storage tank further includes a vent header for venting air from said storage tank.

19. The system as defined in claim 18, wherein said vent header includes a filter system for controlling odors from said air vented from said storage tank.

20. The system as defined in claim 17, wherein said storage tank is adapted to receive sludge by pipeline.

21. The system as defined in claim 17, wherein said storage tank is adapted to receive sludge from a tanker trailer.

22. The system as defined in claim 21, further including a sludge tanker trailer for delivering sludge to said storage tank, said sludge tanker trailer including an air diffuser for mixing and aerating said sludge within said sludge tanker trailer.

23. The system as defined in claim 22, wherein said sludge tanker trailer further includes a vent header for venting air from said sludge tanker trailer.

24. The system as defined in claim 23, wherein said vent header includes a filter system for controlling odors from said air vented from said sludge tanker trailer.

25. A system for combusting sludge within a combustor, comprising:
- a storage tank for receiving sludge having a solids content, said storage tank including an air diffuser for metering air into said storage tank thereby mixing and aerating said sludge within said storage tank, wherein said storage tank is adapted to receive sludge from a tanker trailer;
- a sludge tanker trailer for delivering sludge to said storage tank, said sludge tanker trailer including an air diffuser for mixing and aerating said sludge within said sludge tanker trailer and a level transmitter for indicating the level of sludge within said sludge tanker trailer; and
- a sludge injection and combustion module for injecting said sludge from said storage tank into a combustion zone of a combustor.

26. The system as defined in claim 22, wherein said sludge tanker trailer further includes an air blower for providing fresh air into said sludge tanker trailer through said air diffuser.

27. A system for combusting sludge within a combustor, comprising:
- a storage tank for receiving sludge, said storage tank including an air diffuser for mixing and aerating said sludge within said storage tank;
- a sludge injection and combustion module for injecting said sludge from said storage tank into a combustion zone of a combustor; and
- a sludge tanker trailer for delivering sludge to said storage tank, said sludge tanker trailer including an air diffuser for mixing and aerating said sludge within said sludge tanker trailer and an air blower for providing fresh air into said sludge tanker trailer through said air diffuser, wherein said air blower provides a positive air pressure within said sludge tanker trailer for pneumatic unloading of sludge.

28. A system for combusting sludge within a combustor, comprising:
- a storage tank for receiving sludge, said storage tank including an air diffuser for mixing and aerating said sludge within said storage tank;
- a sludge injection and combustion module for injecting said sludge from said storage tank into a combustion zone of a combustor; and
- a sludge tanker trailer for delivering sludge to said storage tank, said sludge tanker trailer including an air diffuser for mixing and aerating said sludge within said sludge tanker trailer and a diffuser header connected to said air diffuser, said diffuser header being further connected to a source of tractor engine exhaust for directing said tractor engine exhaust into said sludge tanker trailer through said air diffuser.

* * * * *